United States Patent [19]

Lin

[11] Patent Number: 4,960,291

[45] Date of Patent: Oct. 2, 1990

[54] AUTOMOTIVE SUSPENSION SYSTEM

[76] Inventor: Chien-Hung Lin, No. 150, Chung-Hsiao Rd., Chia-Li Chen, Tainan Hsien, Taiwan

[21] Appl. No.: 362,291

[22] Filed: Jun. 6, 1989

[51] Int. Cl.$^5$ ............................................. B60G 17/00
[52] U.S. Cl. ...................................... 280/710; 280/709
[58] Field of Search ............................... 280/707–714, 280/690, 701, 673

[56] References Cited

U.S. PATENT DOCUMENTS

| | | | |
|---|---|---|---|
| 4,726,453 | 2/1988 | Obstfelder | 280/707 |
| 4,732,407 | 3/1988 | Oyama et al. | 280/707 |
| 4,805,923 | 2/1989 | Soltis | 280/707 |

Primary Examiner—Richard A. Bertsch
Attorney, Agent, or Firm—Finnegan, Henderson, Farabow, Garrett & Dunner

[57] ABSTRACT

An automotive suspension system including a suspension cylinder installed between the automobile frame and the control arm of the automobile wheel; a hydraulic apparatus including two corresponding hydraulic cylinders each cylinder having a combination of a piston and a piston rod; a combination coil-spring and shock absorber member sandwiched between the two piston rods of the cylinders and being compressed thereby; and a control device for directing the flow of the hydraulic fluid from the suspension cylinder to either of the two cylinders. One of the cylinders has a sectional diameter which is larger than that of the suspension cylinder and the remaining cylinder has a sectional diameter which is smaller than that of the suspension cylinder. As the result of the effect provided by the control of the control device of the suspension system, an automobile using it will provide a good cushioning effect to the user(s) thereof and will minimize the risk of overswing or flipping when making a turn.

4 Claims, 4 Drawing Sheets

AUTOMOTIVE SUSPENSION SYSTEM

BACKGROUND OF THE INVENTION

The present invention relates to an improved suspension system for an automobile, more particularly to an automotive coil spring suspension system with both shock absorption and anti-swing functions.

FIG. 1 illustrates a typical automotive suspension arrangement using a coil spring at the front wheels of an automobile. The weight of the vehicle applies an initial pressure on the springs thereof. When the wheels encounter irregularities in the road, the springs further compress or expand to absorb most of the shock. The suspension system which is provided at the rear wheels of an automobile is relatively simple in most vehicles. However, the suspension system provided at the front wheels of an automobile is considerably more complex because said front wheels must swing from side to side to allow for steering. In view of this, multi-point attachments are provided that permit the wheels of a car to move up and down and still be turned from side to side for steering purposes. In FIG. 1, a conventional automotive, front-wheels suspension system referred to as a "Macpherson front suspension," is shown. In this system, a shock absorber 11 is used at each front wheel of the automobile to restrain spring 12 movement and prevent prolonged oscillation. The shock absorber 11 contains a piston that moves in a cylinder as the automobile wheel moves up and down with respect to the automobile frame. The MacPherson suspension is a coil-spring system in which the shock absorber is located inside the spring. This system requires neither upper and lower suspension nor control arms and is widely used in smaller, front-wheel-drive vehicles because of the simplicity, low weight, low cost and compactness thereof.

It has been noted that in a conventional automotive front wheel suspension system, the design of the coil spring differs greatly from that of the spring of the Macpherson system. In the conventional system the coil spring is required to be as soft as possible in order to respond to the continuous irregularities of the surface of the road. However, when a vehicle is steered in a certain direction, the coil spring must maintain a maximum rigidity in order to prevent the car from swinging away from the intended course. The fulfillment of both of these requirements in a single coil spring necessarily makes the the manufacture thereof very difficult.

SUMMARY OF THE INVENTION

It is therefore a main object of the present invention to provide an improved automotive suspension system which can obviate the disadvantages of conventional suspension systems.

An important feature of the present invention is the provision, between the automobile wheel and the automobile, of a suspension cylinder having a piston enclosed therein and a combination coil-spring and shock absorber which is actuated in response to the movement of the piston within the suspension cylinder.

Another feature of the present invention is a hydraulic apparatus which is associated with the suspension system so as to control the compression and expansion of the coil spring. The hydraulic apparatus includes a primary hydraulic cylinder, an auxiliary hydraulic cylinder and a hydraulic control device.

Accordingly, an improved automotive suspension system comprises a suspension cylinder equipped between the automobile wheel and the frame having a first piston which moves therein in response to the irregularities of the surface of the road, a first hydraulic means having a second piston enclosed therein Which moves in response to the movement of said first piston but with a smaller stroke, a second hydraulic means having a third piston enclosed therein which is actuated during the turning of the associated vehicle to control the movement of said first piston in said suspension cylinder, a combination elastic element and shock absorber provided between said first and second cylinders so as to be compressed in response to the movements of said second and third pistons, and a hydraulic control device for controlling the activation of said first and second cylinder.

BRIEF DESCRIPTION OF THE DRAWINGS

These and other advantages, features and objects of the present invention will become apparent from the following detailed description of the preferred embodiment of the present invention with reference to the accompanying drawings, in which.

DETAILED DESCRIPTION OF THE PREFERRED EMBODIMENT

Figure 1:
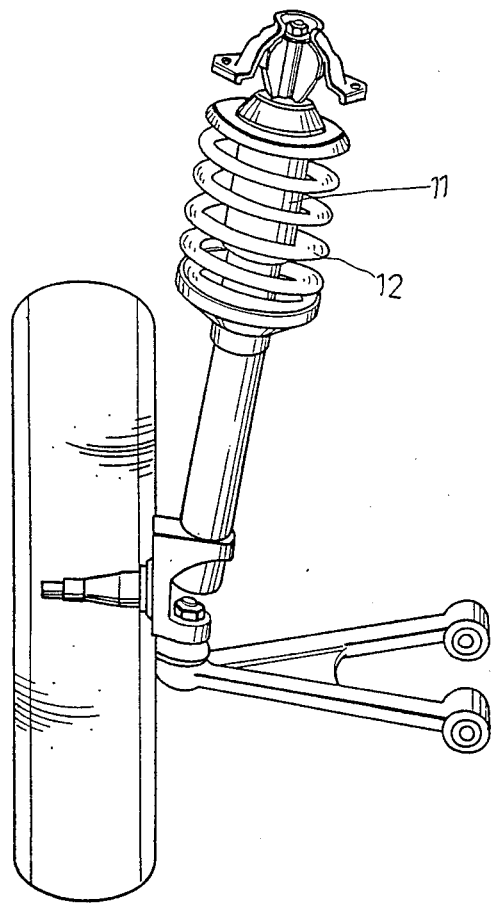
FIG. 1 is a perspective view of a conventional MacPherson suspension system used in a vehicle.
Figure 2:
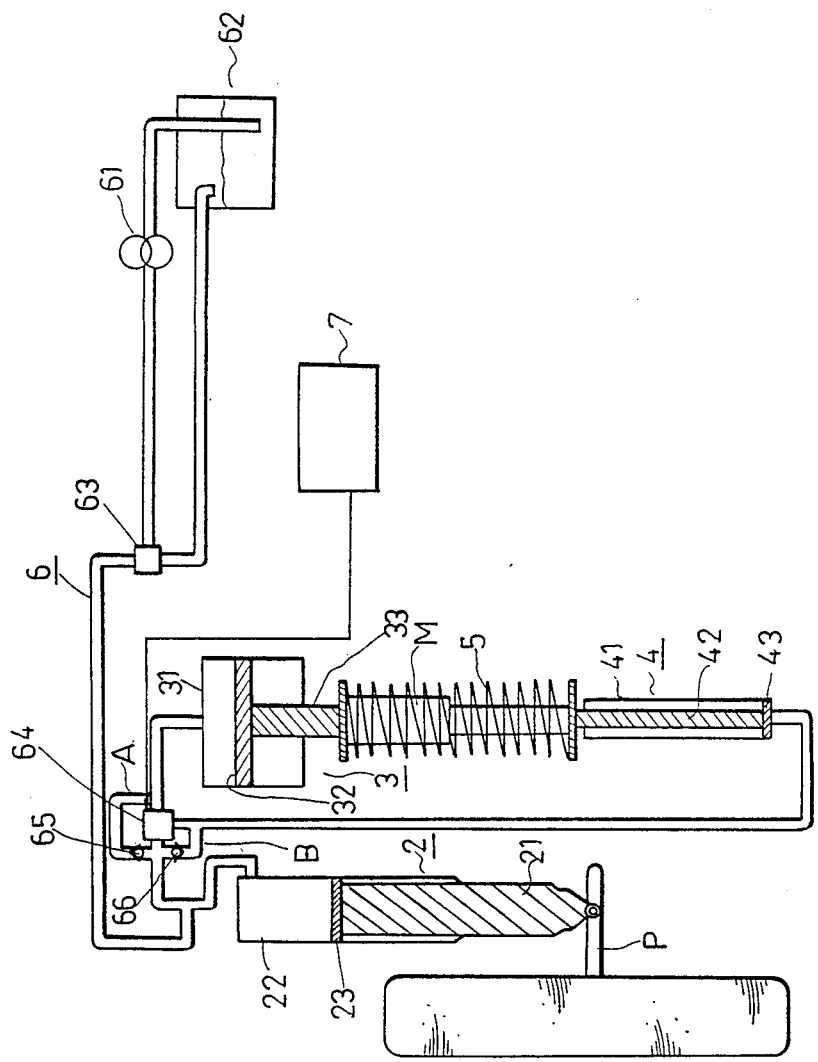
FIG. 2 is a schematic diagram of the improved suspension system according to the present invention.

Referring to FIG. 2 which shows a schematic diagram of the improved automotive suspension system of the present invention, such a suspension system primarily comprises a suspension cylinder 2, a primary cylinder 3, an auxiliary cylinder 4, a combined coil spring 5 and shock absorber (M), a hydraulic fluid piping system 6 and a hydraulic controller 7.

The suspension cylinder 2 further includes a cylinder housing 22 with the top portion thereof connected to a vehicle frame, and a piston 23 having a piston rod 21 connected and extending downwardly thereto. The lower end of the piston rod 21 is connected to the control arm (P) of the wheel. The piston 23 moves in said housing 22 in response to the irregularities of the surface of the road encountered by the automobile wheels.

The primary cylinder 3 includes a cylinder housing 31 connected to the car frame having a piston 32 moving therein. A piston rod 33 extends from said piston 32 with the lower end thereof connected to the top of the combination coil-spring and shock absorber. A first hydraulic fluid pipe is provided to communicate the suspension cylinder 2 and the primary cylinder 3. It is specially designed so that the sectional diameter of the housing 31 is larger than the sectional diameter of the suspension cylinder housing 22 to enable the moving stroke of the piston 32 to be always shorter than that of the piston 23 in the suspension cylinder 2.

The auxiliary cylinder 4 includes a housing 41 also connected to the vehicle frame having a piston 43 movably provided therein. A piston rod 42 extends upwardly from the piston 43 with the upper end thereof connected to the combination coil-spring and shock absorber. It is appreciated that the auxiliary cylinder 4 is positioned in alignment with the primary cylinder 3 so that the combination coil-spring and shock absorber pair will be sandwiched therebetween. The sectional diameter of the auxiliary cylinder housing 41 is designed to be much smaller than that of the suspension cylinder 2. Therefore, the stroke of the piston 43 is much greater than that of the piston 23 in the suspension cylinder 2. Again, a second hydraulic fluid pipe is provided to communicate the auxiliary cylinder 4 and the suspension cylinder 2.

The shock absorber (M) is provided inside of the coil spring 5 and has a function which is the same as that of a shock absorber in a conventional Macpherson suspension system.

The hydraulic fluid piping system 6 includes a fluid tank 62, an automobile engine-operated pump 61, two fluid distributing valves 63, 64, two check vales 65, 66 and a plurality of fluid pipes inter-connecting the various structural elements of the suspension system of the present invention. The fluid distributing valve 63 is operated to distribute the pumped fluid from the tank 62 into the various suspension cylinders 2 at each automobile wheel. Another fluid distributing valve 64 is operated to cooperate with the two check valves 65, 66 for controlling the fluid flow from the suspension cylinder 2 to either the primary cylinder 3 or the auxiliary cylinder 4.

The hydraulic control device 7 is operated as a sensor for detecting the driving status of the vehicle, such as the relative position between the automobile frame and the automobile wheels, the steering angle which reveals whether or not the vehicle is being turned and accelerating or braking actions, etc. The device 7 also controls the operation of the hydraulic fluid distributing valve 64 to allow the fluid in the suspension cylinder 2 to communicate with either the primary cylinder 3 or the auxiliary cylinder 4. It is to be particularly noted that the actual physical structure of the control device 7 is like that of an electronic element and can be achieved by those skilled in the art of electric circuit design. The structure of the control device 7 will not be detailed herein for the purpose of simplicity.

Figure 3:
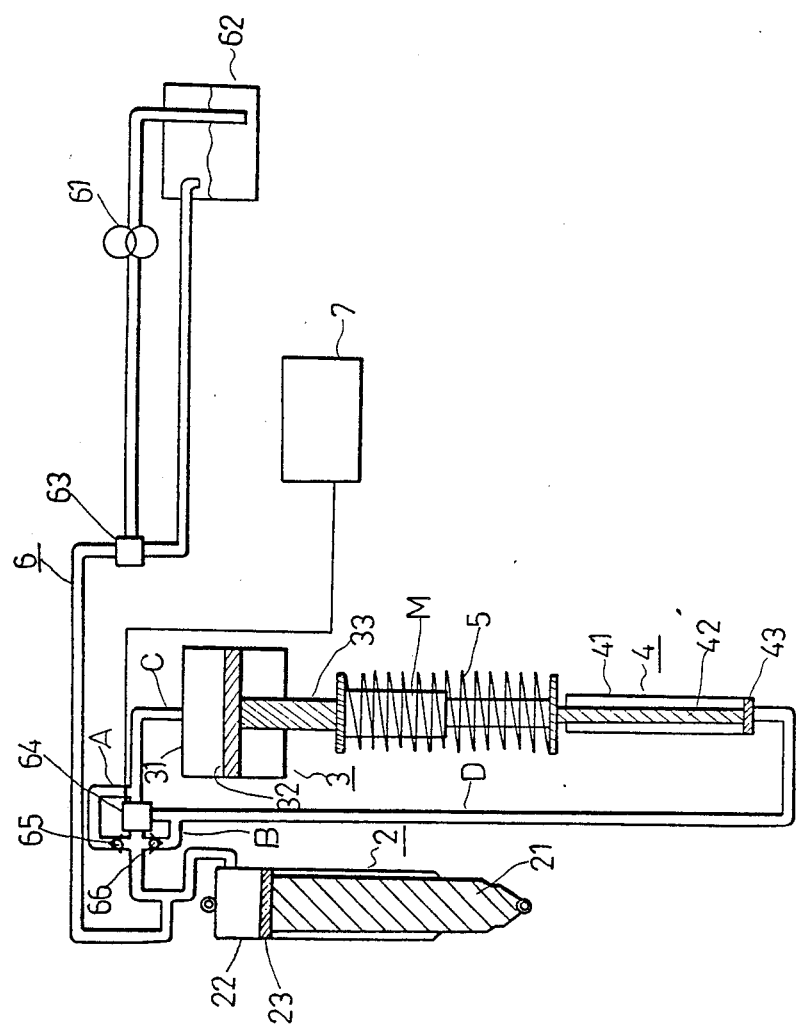
FIGS. 3 and 4 are schematic diagrams of the improved suspension system of the present invention showing the operation thereof.
Figure 4:
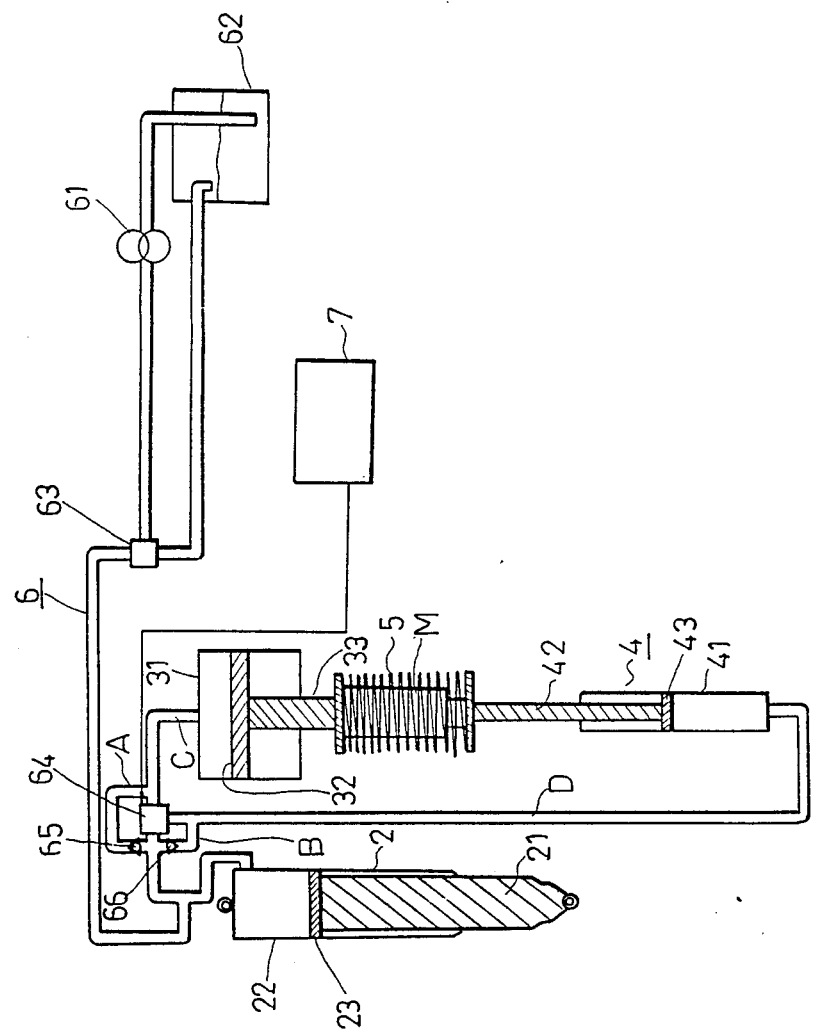

Referring to FIGS. 3 and 4, the operation of the improved automotive suspension system of the present invention will be described hereinbelow. When the vehicle is being driven on a road, the surface of which has relatively few irregularities, the control device 7 will control the fluid distributing valve 64 to allow fluid communication between the suspension cylinder 2 and the primary cylinder 3 through a first fluid pipe C. When the piston rod 21 connected to the control arm is compressed, the piston 23 moves upward, causing the hydraulic fluid to flow from the suspension cylinder 2 into the primary cylinder 3. Because the sectional area of the primary cylinder 3 is larger than that of the suspension cylinder 2, the stroke of the piston 32 in the primary cylinder 3 is shorter than that of the piston 23 in the suspension cylinder 2. Therefore, the coil spring 5 is depressed by the piston rod 33 of the cylinder 3 in a very small amount. In other words, the whole car will experience only a very small up and down movement. An excellent cushioning effect is the result of the use of the automobile suspension system of the present invention according to the operation stated hereinabove. The suspension system of the present invention will continue to operate in the manner described above barring a change in the driving status of the vehicle which is detected by the fluid control device 7.

Referring to FIG. 4, once the control device 7 detects that the automobile is being turned, the flow of hydraulic fluid from the suspension cylinder 2 will immediately be communicated with the auxiliary cylinder 4 instead of the primary cylinder 3. The vehicle frame will cause the cylinder housing 22 to move downward, squeezing the hydraulic fluid from the suspension cylinder 2 into the auxiliary cylinder 4 through second fluid pipe (D). Since the sectional area of the auxiliary cylinder 4 is much smaller than that of the suspension cylinder 2, the piston 41 together with the piston rod 42 will be forced to move upward in a stroke the distance of which is much larger than that of the piston 23 in the suspension cylinder 2. The hydraulic fluid in the auxiliary cylinder 2 will force the piston 41, together with the piston rod 42, to move upward and compress the coil spring 5. The great depressibility of the coil spring 5 will enable the car frame to maintain the vehicle in horizontal position and thus prevent said vehicle from swinging or flipping over when making a turn.

When the vehicle completes a turn, the control device 7 will again switch the flow of the hydraulic fluid from pipe (D) to pipe (C). The suspension system will then return to its original and normal operative state.

The advantages and utility of the improved automotive suspension system according to the present invention have been described hereinabove. Although it has been described by way of preferred embodiment, modifications and changes are still possible for those skilled in the art without departing from the spirit of the present invention.

What is claimed is:

1. A suspension system for a motor vehicle having at least one control arm for pivotably connecting one of the wheels of the motor vehicle to the frame of the vehicle comprising:

a suspension cylinder having a housing and a piston with a piston rod formed thereon, said housing being secured to the vehicle frame, said piston moving in said housing with said piston rod thereon being connected to the control arm of the wheel;

a primary hydraulic cylinder having a housing and a piston which is movable therein, said piston having a piston rod formed thereon, said housing of said primary cylinder being secured to the vehicle frame and hydraulically communicating with said housing of said suspension cylinder through a first fluid pipe;

an auxiliary hydraulic cylinder having a housing and a piston which is movable therein with a piston rod formed thereon, said housing of said auxiliary cylinder being secured to the vehicle frame and hydraulically communicating with said housing of said suspension cylinder through a second fluid pipe;

a combination coil-spring and shock absorber installed and secured between said piston rods of said primary and auxiliary hydraulic cylinders; and a control means for controlling the flow of hydraulic fluid from said suspension cylinder to said primary hydraulic cylinder and to said auxiliary hudraulic cylinder;

said primary hydraulic cylinder having a sectional diameter which is larger than that of said suspension cylinder, and said auxiliary hydraulic cylinder having a sectional diameter which is smaller than that of said suspension cylinder;

said control means, in response to a first ooperative state of the vehicle in which the wheel thereof is facing straight ahead, directing the flow of the hudraulic fluid from said suspension cylinder into said primary hydraulic cylinder through said first fluid pipe and, in response to a second operative state in which the wheel is turned to the left or right, directing the flow of the hydraulic fluid from said suspension cylinder into said auxiliary hydraulic cylinder through said second fluid pipe.

2. The suspension system of claim 1, wherein said control means is a hydraulic fluid distributing valve.

3. The suspension system of claim 1, wherein said piston rod of said primary hydraulic cylinder is in alignment with said piston rod of said auxiliary hydraulic cylinder.

4. The suspension system of claim 1, wherein the shock absorber is inside of the coil-spring of said combination coil-spring and shock absorber.

* * * * *